United States Patent Office 3,343,564
Patented Sept. 26, 1967

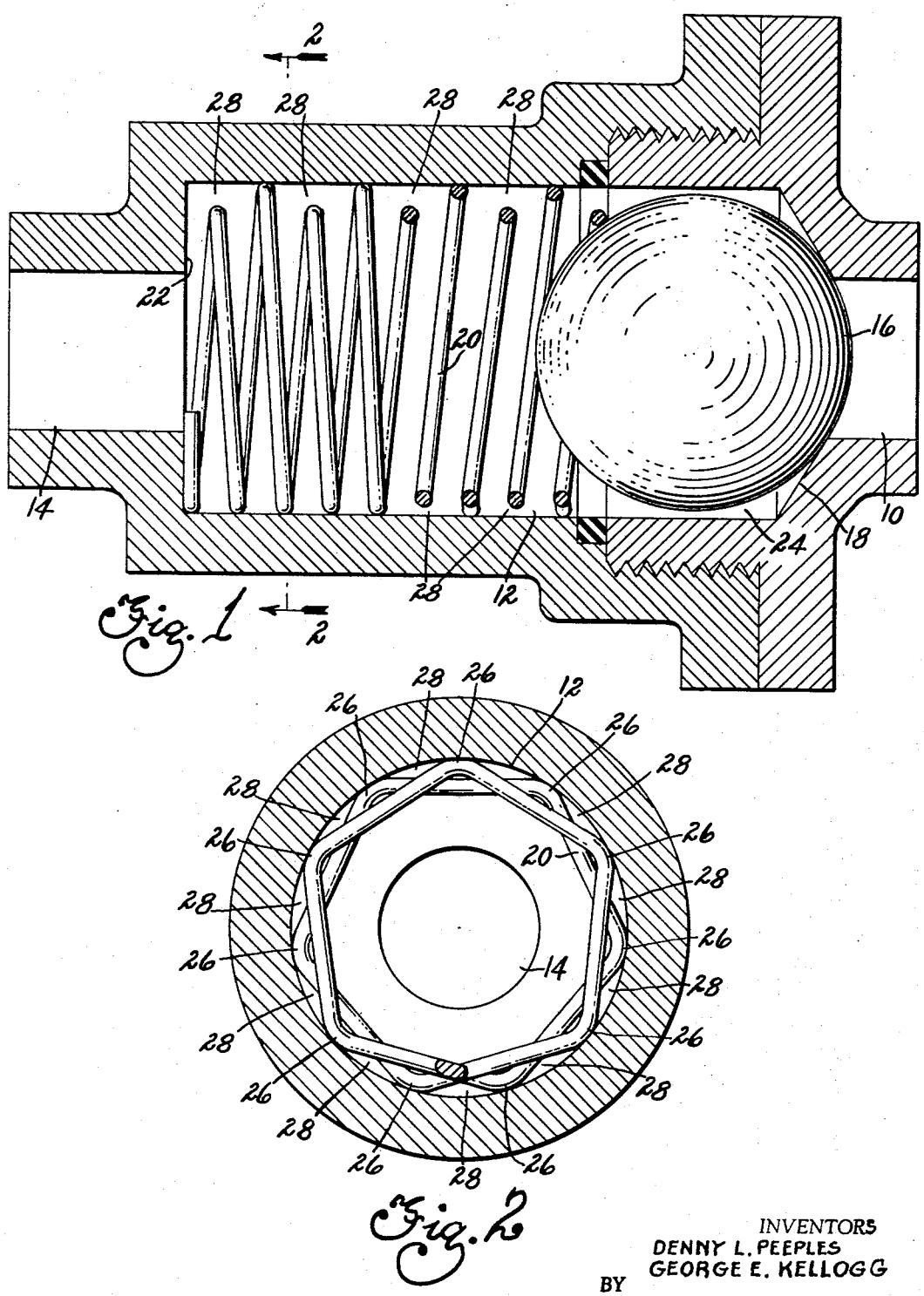

3,343,564
BALL CHECK VALVE HAVING PARTICULAR
SPRING MEANS
Denny L. Peeples, Dayton, and George E. Kellogg, Miamisburg, Ohio, assignors to General Motors Corporation, Detroit, Mich., a corporation of Delaware
Filed Dec. 8, 1964, Ser. No. 416,812
5 Claims. (Cl. 137—539)

ABSTRACT OF THE DISCLOSURE

In a preferred form the present invention relates to a check valve assembly including a spring loaded ball, the significant feature being the offset pentagonal shape of the adjacent spring coils which serve to axially locate the ball during its operable movement as well as providing the paths for fluid flow through the spring when completely compressed.

---

This invention relates to springs and more particularly to a spring adapted for use in a ball check valve arrangement.

In a ball check valve, a problem is encountered that is caused by a sealing of a flow passage when a ball is unseated. This can occur when a common coil spring having a regularly shaped outer periphery is used that corresponds to the inner periphery of a bore in which the spring is disposed. Normally, the ball in a flow-through check valve is substantially the same size as the bore. A passage is normally blocked by one portion of the ball and fluid is designed to pass around the outer periphery of the ball when the ball becomes unseated. The coil spring mounted against the outer periphery of the ball can effectively seal the small space between the ball and the bore thereby preventing flow past the ball. The present invention is meant to obviate this problem.

It is an object of the present invention to provide an improved spring adapted for use to load a ball in a flow-through check valve.

It is another object of the present invention to provide an improved spring that locates on the inner wall of a substantially cylindrical bore in which a ball is disposed to control fluid flow therethrough.

It is still another object of the present invention to provide an improved spring having an irregularly shaped outer periphery arranged to allow fluid flow through the coils of the spring when it is completely compressed.

It is a further object of the present invention to provide an improved spring element of polygonal shape that locates on the inner periphery of a bore in which a ball is disposed which is adapted to center the ball against a seat and which is completely compressible while allowing fluid flow through the convolutions of said spring.

Further objects and advantages of the present invention will be apparent from the following description, reference being had to the accompanying drawings wherein a preferred embodiment of the present invention is clearly shown.

In the drawings:

FIGURE 1 is a sectional view of a common flow-through check valve in which the invention is operatively located;

FIGURE 2 is a sectional view taken along line 2—2 of FIGURE 1.

Referring to FIGURE 1, an inlet 10 into a bore 12 provides fluid that is adapted to flow to an outlet 14. A ball 16 is disposed in the bore 12 and is adapted to be moved in and out of engagement with a seat 18. When the ball is seated against the seat 18, the inlet 10 is blocked from fluid flowing therein and no fluid flow occurs in the bore 12 to the outlet 14. A spring 20 comprised of irregularly shaped convolutions is located against the bore 12 at its outer periphery. One end of the spring 20 engages a wall 22 formed at the end of the bore 12 and another end of the spring 20 engages the ball 16. Under normal operating conditions, the spring 20 biases the ball against the seat 18, effectively blocking fluid flow from the inlet 10. It is to be noted that the ball 16 is substantially the same size as the bore 12 but, when centrally located in the bore 12, a space 24 substantially surrounding the ball is provided for fluid flow when the ball is moved from the seat 18.

Referring to FIGURE 2, the convolutions of the spring 20 are seen to be pentagonal in shape and the rounded angles 26 of the pentagon shape are always disposed between another pair of angles 26 in an adjacent coil. Therefore, when the spring is in free form or fully compressed, a path for fluid flow exists in the openings 28. It is seen that, if the spring is in free form, the space between the angles 26, as linearly aligned in alternate coils, provides a path for fluid flow whereas the space 28 decreases in size when the spring is compressed but yet maintains a spacing between adjacent coils to allow fluid to flow from the outer periphery of the ball to the interior portion of the spring 20. The spring 20 is formed of any well-known resilient material and can assume any form that provides at least three bearing surfaces on the bore 12 to lock the spring therein. It is obvious then that a triangular shaped spring provides the minimum number of bearing surfaces consonant with the invention disclosed herein. A limitless number of contact surfaces can be provided for any given coil as long as adjacent coils are asymmetrically disposed relative to one another. Any asymmetry between adjacent coils forming a multi-sided figure provides space through which fluid can flow. It is also understood that the polygonal-shaped coils provide a bearing surface serving to center the ball 16 on the seat 18. Therefore, there is no regular meeting of the end of the spring 20 to the outer surface of the ball 16 which would prevent the free flow of fluid in between.

As seen in FIGURE 2, the spring 20 is formed so that adjacent coils form hexagons with each succeeding coil rotated back on to the previous one so as to center the sixth angle on the sixth side of the previous coil. Therefore, each two coils additively have eleven separate sides and eleven separate angles. In view of the incompleteness of the hexagon shape, the coils are sometimes referred to herein as pentagons, it being understood that one extra side and one extra angle exist between pairs thereof. It is further understood that any shape polygon offering more than three exposed sides and three angles for contacting the bore 12 is included within the scope of this invention. It should be noted that the geometric figure description given herein is accurate when a coil is viewed longitudinally with respect to the spring as formed. Lateral viewing of the spring will show a multiplanar shape similar to an advancing screw thread rather than a straight line as would be the case viewing a flat polygon shaped coil.

In an operative situation, the inlet 10 contains a fluid under pressure. The outlet 14 is supplied fluid from the inlet 10 at a predetermined pressure level. Therefore, the ball 16 functions as a relief valve when it is driven from its seat 18. Flow to the outlet 14 can be accomplished only by providing a path past the ball 16 and the spring 20. This is accomplished, as previously stated, by the ball 16 being slightly undersized with respect to the bore 12 and by use of a spring 20 having coils of polygonal shape, adjacent coils being offset relative to one another. The space 28 is therefore formed between adjacent coils due to the non-linear disposition or matched relationship of adjacent coils. The problem associated with flow past a ball check valve does not become acute until the spring loading the ball becomes fully compressed. When a typical coil spring is used, a fully compressed coil spring forms a substantially closed cylindrical sleeve behind the ball preventing the free flow of fluid an inlet to an outlet of the type shown in FIGURE 1. This invention provides the spaces 28 to obviate this problem.

When the pressure in the inlet 10 decreases below a quantity equal to the force provided by the spring 20, the ball 16 is repositioned to engage the seat 18 and, therefore, acts as a check valve when pressure in the outlet 14 exceeds the pressure in the inlet 10. During this latter phase of operation, the spring 20 functions in a conventional manner.

Therefore, it is seen that the spring 20, as provided in this invention, has sufficient surface contact on its outer periphery due to its polygonal shape to properly locate the ball in a centered disposition relative to the bore 12 and yet allows free fluid communication between an inlet 10 and an outlet 14 whether the spring is partially or fully compressed. Alternate coils contacting the bore 12 also prevents a cocking or misalignment of the spring 20 relative to the bore 12, therefore allowing reliable and consistent functioning of the check valve over a period of usage.

While the embodiment of the present invention, as herein disclosed, constitutes a preferred form, it is to be understood that other forms might be adopted.

What is claimed is as follows:

1. A check valve having a spring and ball movable in a cylindrical passage, said spring comprising: a series of resilient wire loops engaging an inside periphery of the passage; said series of resilient wire loops including a first group of alternate loops formed in a polygon and being aligned axially so that faces of said polygon correspond in spatial relationship; said series of resilient wire loops including a second group of alternately spaced loops formed in a polygon with faces of said polygon corresponding in spatial relationship with each loop in said second group but being angularly offset from the faces of the polygonal loops of said first group of alternate loops, the ball of the check valve substantially filling the cross section of the passage and allowing fluid flow thereby, said first and second groups of alternately spaced loops engaging the inside periphery of the passage and allowing fluid flow by the spring through spaces created by the offset disposition of the adjacent polygonal loops relative to the passage.

2. A check valve according to claim 1 wherein said loops are a plurality of convolutions having an irregularly shaped periphery arranged to contact an inside surface of a substantially cylindrical fluid passage, said convolutions substantially pentagonal in shape thereby providing a path for fluid flow from the exterior portion of said loops to the interior of said loops during operating conditions when the spring is fully compressed due to an unseated ball check valve.

3. A check valve for use in a substantially cylindrical passage, said check valve comprising: a slidable element disposed in the cylindrical passage arranged to selectively block an inlet thereto, said slidable element being positioned in the passage by the slidable element substantially filling the passage; and biasing means for maintaining a pressure on a first side of said slidable element thereby blocking the inlet to the passage, said biasing means having a series of irregularly shaped convolutions engaging an inside periphery of the passage, said irregularly shaped convlutions cooperating to form multiple paths for fluid flow from the exterior to the interior of said convolutions during operating conditions when a pressure on a second side of the slidable element fully compresses said biasing means, said biasing means constantly guiding said slidable element during movement thereof.

4. The check valve according to claim 3 wherein the biasing means comprises a series of connected coils of polygonal shape, said series of coils having adjacent coils offset relative to each other so that like angles of the polygonal shaped coils are not radially aligned relative to an axis common to said series of coils when in juxtaposed relationship thereby providing paths for fluid flow from the exterior of said series of coils to the interior of said series of coils when the biasing means is fully compressed.

5. The check valve according to claim 3 wherein the slidable element is a ball.

References Cited

UNITED STATES PATENTS

| | | | |
|---|---|---|---|
| 2,400,817 | 5/1946 | Fox et al. | 137—539 X |
| 2,458,118 | 1/1949 | Tursky. | |
| 3,033,622 | 5/1962 | Renner. | |

WILLIAM F. O'DEA *Primary Examiner.*

D. H. LAMBERT, *Assistant Examiner.*